United States Patent

Hentschel

[15] 3,646,389

[45] Feb. 29, 1972

[54] REACTIVELY LOADED INTERDIGITAL SLOW WAVE CIRCUITS HAVING INCREASED INTERACTION IMPEDANCE AND TUBES USING SAME

[72] Inventor: John E. Hentschel, East Brunswick, N.J.

[73] Assignee: Varian Associates, Palo Alto, Calif.

[22] Filed: June 14, 1966

[21] Appl. No.: 557,408

[52] U.S. Cl. ............................315/3.5, 315/39.3, 315/39.73

[51] Int. Cl. ..........................................................H01j 23/28

[58] Field of Search ...........................315/3.5, 5, 39.3, 39.73

[56] References Cited

UNITED STATES PATENTS 3,381,159 4/1968 Janis .......................................315/3.5

*Primary Examiner*—Rodney D. Bennett, Jr.
*Assistant Examiner*—Daniel C. Kaufman
*Attorney*—Stanley Z. Cole

[57] ABSTRACT

The present invention relates in general to reactively loaded interdigital slow wave circuits and, more particularly, to such circuits provided with elongated reactive loading elements to provide a more uniform intensity of the electric fields of the circuit in the interaction region, whereby the interaction impedance of the circuit is increased. Such improved circuits are especially useful for forward wave amplifiers both of the crossed field and O-type to provide increased efficiency and power output.

10 Claims, 15 Drawing Figures

Figure 1:
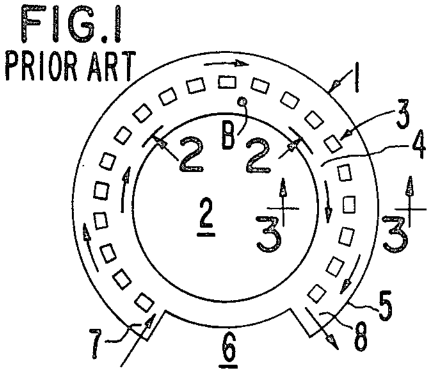
FIG.1 PRIOR ART

INVENTOR.
JOHN E. HENTSCHEL
BY Wm J. Nolan
ATTORNEY

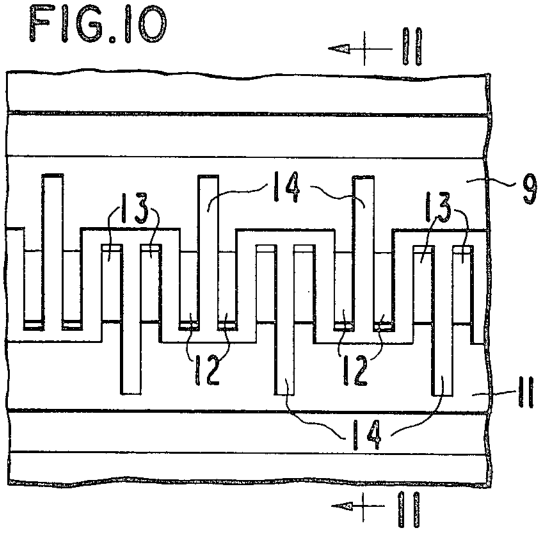
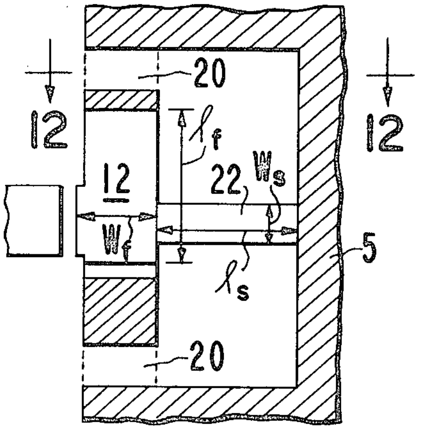
FIG.11
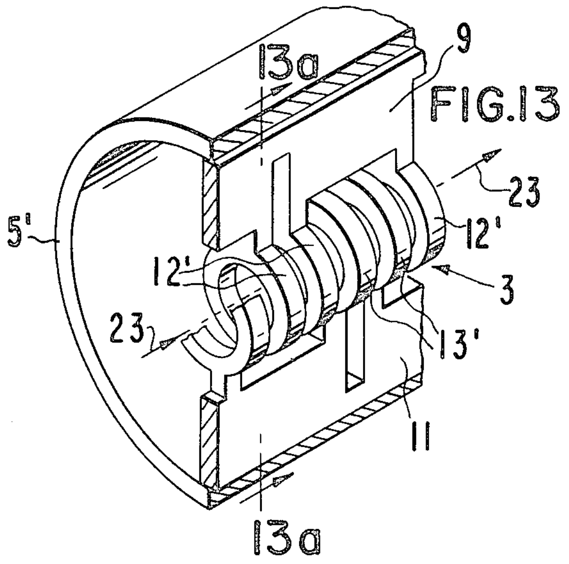
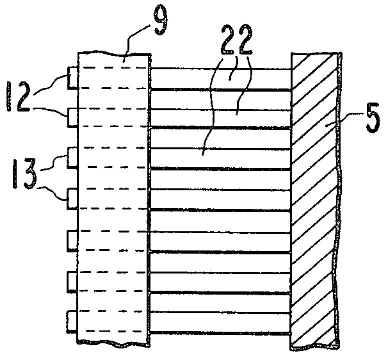
FIG.12
FIG.13a
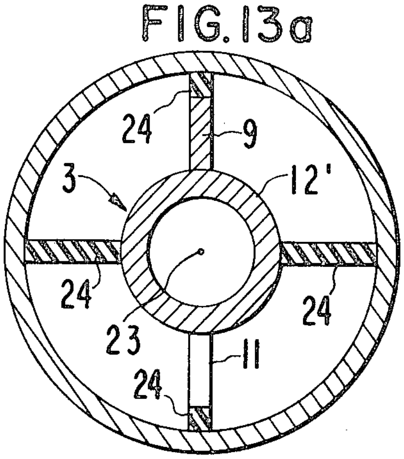
FIG.14
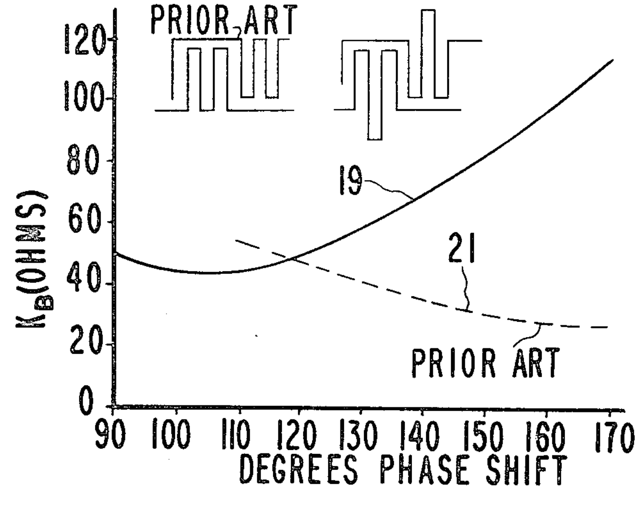
INVENTOR.
JOHN E. HENTSCHEL
BY Wm. J. Nolan
ATTORNEY

REACTIVELY LOADED INTERDIGITAL SLOW WAVE CIRCUITS HAVING INCREASED INTERACTION IMPEDANCE AND TUBES USING SAME

Heretofore, reactively loaded interdigital line periodic slow wave circuits have been proposed for both type M and O tubes. However, it has been found that in these prior circuits, which have had interdigital fingers of equal length, that the fields of the reactive loading elements are reduced in the interaction region compared to the field intensity of the adjoining interdigital elements. It has been found that this nonuniformity in the field intensity of the interacting fields of the circuit leads to a substantial reduction of the interaction impedance of the circuit and in crossed field tubes has the further disadvantage of producing a field component over the desired range of operating parameters of magnetic field intensity B and anode to cathode voltage which enhances cyclotron resonance of the electrons in the crossed field interaction region. This cyclotron resonance absorbs energy from the circuit and greatly reduces the operating efficiency and power output of the tube.

In the present invention, these adverse effects are overcome by increasing the length of the reactive loading elements of the circuit to increase the field intensity of the reactive loading elements in the interaction region, whereby the interaction impedance of the circuit is substantially increased. Such improved circuits provide increased efficiency and power output of tubes using same. In a preferred embodiment of the present invention the reactive loading elements have a length which is at least twice the length of the adjoining elements.

The principal object of the present invention is the provision of an improved reactively loaded interdigital line slow wave circuit and tubes using same.

One feature of the present invention is the provision of reactive loading elements which have a length which is substantially greater than the length of the adjoining periodic elements to improve the uniformity of the interaction field intensities in a direction taken along the circuit and to increase the interaction impedance of the slow wave circuit.

Another feature of the present invention is the same as the preceding feature wherein the reactive loading elements have lengths which are at least twice the length of the adjoining elements.

Another feature of the present invention is the same as any one or more of the preceding features wherein the interdigital slow wave circuit is either crown or stub supported.

Another feature of the present invention is the same as any one or more of the preceding wherein the interdigital elements include a plurality of axially spaced ring members for interaction with a stream of electrons axially projected through the rings.

Figure 2:
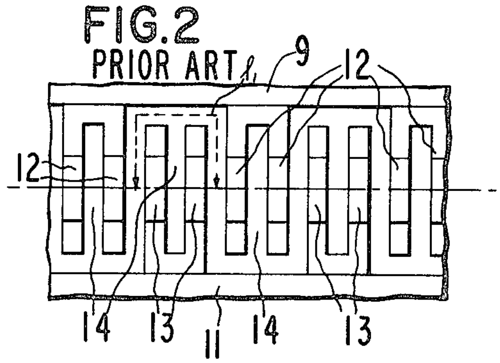
FIG.2 PRIOR ART
Figure 3:
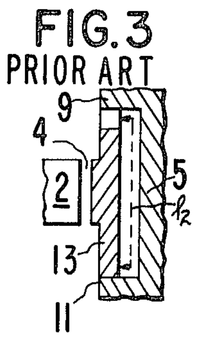
FIG.3 PRIOR ART
Figure 4:
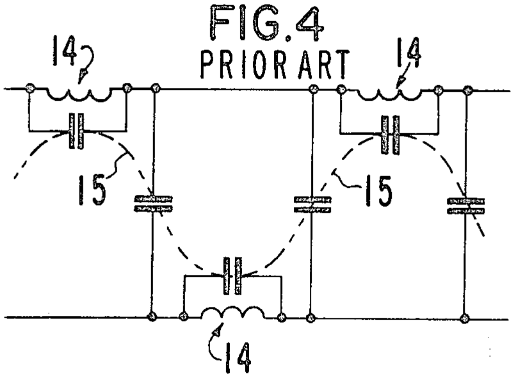
FIG.4 PRIOR ART
Figure 5:
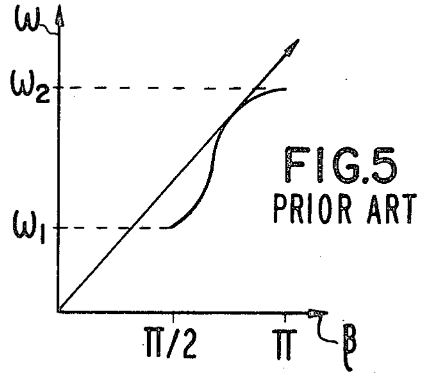
FIG.5 PRIOR ART
Figure 6:
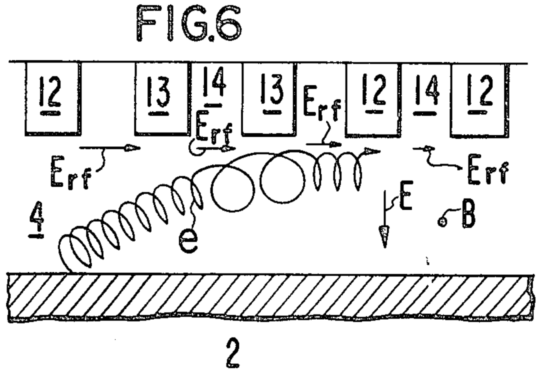
Figure 7:
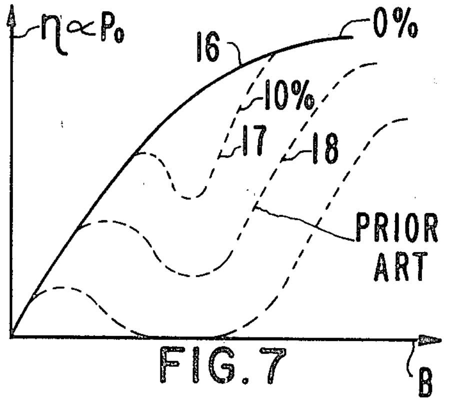
Figure 8:
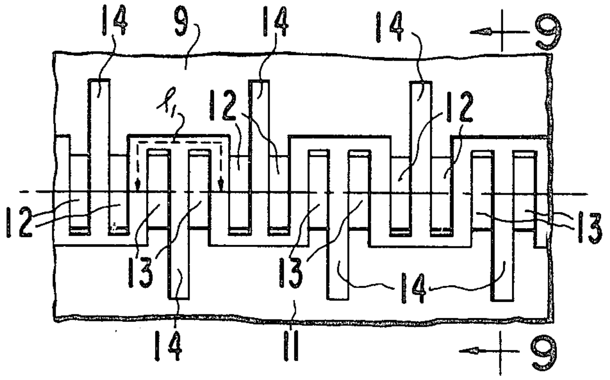
Figure 9:
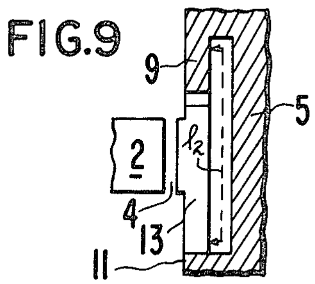

Other features and advantages of the present invention will become apparent upon a perusal of the following specification taken in connection with the accompanying drawings wherein:

FIG. 1 is a schematic line diagram of a prior art crossed field amplifier,

FIG. 2 is a view of the structure of FIG. 1 taken along line 2—2 in the direction of the arrows, FIG. 3 is a view of the structure of FIG. 1 taken along line 3—3 in the direction of the arrows, FIG. 4 is an equivalent circuit diagram for the slow wave circuit of FIG. 1, FIG. 5 is a plot of frequency $\omega$ versus phase shift per period $\beta$ showing the dispersion characteristics of the circuit of FIG. 1, FIG. 6 is a transverse fragmentary view of the crossed field interaction region of FIG. 1 depicting the mechanism for pumping of the cyclotron orbits of the electrons due to the non uniformity of the electric fields of the prior art slow wave circuit, FIG. 7 is a plot of efficiency $\eta$ or power output $P_o$ versus magnetic field intensity B for its prior art tube of FIG. 1, FIG. 8 is a view similar to that of FIG. 2 showing the improved circuit of the present invention, FIG. 9 is a sectional view of the structure of FIG. 8 taken along line 9—9 in the direction of the arrows, FIG. 10 is a view similar to that of FIG. 8 depicting an alternative stub supported interdigital line circuit of the present invention, FIG. 11 is a sectional view of the structure of FIG. 10 taken along line 10—10 in the direction of the arrows, FIG. 12 is a sectional view of the structure of FIG. 10 taken along line 12—12 in the direction of the arrows, FIG. 13 is a fragmentary perspective view of an alternative embodiment of the present invention, and FIG. 13*a* is a transverse sectional view of an alternative embodiment of the structure of FIG. 13 taken along line 13*a*—13*a*, FIG. 14 is a plot of interaction impedance $K_B$ versus phase shift per section $\beta$ of the slow wave circuits of the prior art and of the present invention.

Referring now to FIGS. 1 to 3 there is shown the prior art crossed field amplifier tube 1. The tube 1 includes a cylindrical cathode electrode 2 which may be a thermionic electron emitter or a cold secondary emitter. An arcuate reactively loaded interdigital line anode circuit 3 is coaxially disposed of said cathode electrode 2 in spaced relation to define an annular electronic interaction region 4 in the space therebetween. A vacuum envelope 5 envelops the anode 3 and cathode 2. An axially directed magnetic field B is provided in the interaction region 4. A circuit server 6 separates the ends of the slow wave anode circuit 3. Wave energy to be amplified is applied to an input terminal 7 of the slow wave circuit 3. The RF signal wave energy travels around the circuit 3 in the direction of the electron stream to produce cummulative electronic interaction with the electron stream and to amplify the signal wave energy as the wave travels around the circuit 3. The amplified wave energy is extracted from the tube 1 at an output terminal 8 and fed to a suitable load, not shown.

The anode circuit 3 comprises a pair of elongated conductor portions 9 and 11 having a plurality of conductive elements or finger portions 12 and 13 outwardly projecting therefrom. The finger portions 12 and 13 are interdigitated to form an interdigital slow wave circuit. In addition, the fingers 12 and 13 are bifurcated to form reactive loading elements 14 (slots) in each of the interdigitated fingers 12 and 13. The reactive loading elements 14 introduce a series reactive loading in each of the elongated conductor portions 9 and 11.

The equivalent circuit for the slow wave circuit 3 is shown in FIG. 4 and the electron stream as shown by the dotted line 15 interacts alternatively with the series and shunt voltages developed in the reactive loading elements 14 and across the spaces between the interdigitated finger portions 12 and 13. As a result a favorable fundamental forward wave tYpe of interaction is obtained as seen by the dispersion characteristic of FIG. 5. The dispersion characteristic is characterized by having a phase shift per section $\beta$ falling between $\pi/2$ and $\pi$ over a very broad band of frequencies. Thus, this type of circuit leads to very broad band tubes. The upper cutoff frequency $\omega_2$ is determined by the path length $\iota_1$ taken along the slow wave circuit 3 in-between points where the wave path crosses the axis of symmetry of the interdigital line. The upper cutoff frequency $\omega_2$ corresponds to a path length $\iota_1$ which is one half an electrical wavelength, as compensated for the shortening of the physical path length due to the reactive loading produced by the reactive loading element or slot 14.

The low-frequency cutoff $\omega_1$ is determined by the particular type of support structure used to support the slow wave circuit 3. If the circuit is supported by insulators, not shown in FIG. 1-3, the low-frequency cutoff is essentially DC or zero frequency. However, if the circuit is crown supported from the envelope 5 as shown in FIG. 1-3 then the low-frequency cutoff corresponds to a frequency wherein the electrical path length $\iota_2$ is a half an electrical wavelength.

The reactively loaded interdigital line circuit 3 and tubes 1 using same are described and claimed in copending U.S. application Ser. NO. 350,504 filed Mar. 9, 1964 and assigned to the same assignee as the present invention.

One of the problems with the prior art reactively loaded interdigital line circuit 3 was that the fingers 12 and 13 and the loading slot 14 were all made of equal length. As a consequence the electric field intensity produced by the reactive loading element in the electronic interaction region 4 was reduced as compared to the shunt field produced between the interdigitated fingers 12 and 13. This reduced field introduced a periodic variation in the electric field strengths seen by an electron in the electron stream. This reduced field follows because the electric field intensity increases according to the sine of the distance taken away from the root portion of the slot toward the free end of the fingers 12 and 13. The reduced field of the reactive loading slot reduced the interaction impedance of the circuit 3. Moreover, in a crossed field geometry as shown in FIG. 6 the periodic weak field regions excite the cyclotron orbits of the electrons of the stream thereby absorbing power from the wave on the circuit 3 without contributing to the desired mode of interaction in a manner similar to the reduced interaction observed in prior art rising sun magnetron tubes. The effect of the field intensity variation is depicted in FIG. 7 where it is seen that if there is no variation in the field intensity the efficiency $\eta$ and power output $P_0$ follows a smooth increase with increase of magnetic field B of the tube as shown by line 16. However, a 10 percent variation in electric field intensity produces a drop of almost 50 percent in the efficiency and power output over a substantial range of operating magnetic field strength B as shown by line 17 which range of B falls within the typically desired magnetron interaction range of parameters of magnetic field strength B and anode to cathode voltage. Actually, the prior art reactively loaded interdigital line circuit 3, which had the slot length equal to the finger length, produced more than a 10 percent variation as shown by line 18 of FIG. 7.

Referring now to FIG. 8 there is shown a view similar to that of FIG. 2 depicting the improved reactively loaded interdigital line slow wave circuit 3 of the present invention. In this circuit 3, the slots 14 are increased in length relative to the length of the interdigitated fingers 12 and 13 to produce a corresponding increase in the electric field of the reactive loading elements 14 in the interaction region 4. When the slots 14 are increased in length to a value of twice the length of the interdigitated fingers 12 and 13 the effect is to produce a circuit with operating parameters similar to that obtained by a 10 percent variation in electric field intensity as shown by line 17 of FIG. 7. In order to maintain the same upper frequency cutoff $\omega_2$, as with the prior art circuit of FIGS. 1–3, the finger length for fingers 12 and 13 must be reduced such that the electrical path length $\iota_1$, when compensated for the reactive loading slot 14, remains the same for the two circuits. Another advantage that accrues from the circuit of the present invention, as shown in FIG. 8, is that the thermal capacity of the circuit is enhanced compared to the prior art circuit of FIG. 1-3. More particularly, the reduced length of the fingers 12 and 13 combined with the increased thickness of the elongated conductor portions 9 and 11 substantially doubles the thermal capacity of the circuit. For example, a circuit of FIG. 1–3 would have a thermal dissipation capacity of 6 watts per bifurcated finger whereas the circuit of FIG. 8 would have a thermal capacity of 12 watts per bifurcated finger.

In a typical example of a circuit of FIG. 8, the distance $\iota_1$, would be 0.250 inches for an upper cutoff of 6.7 gc. with a finger length of 0.200 inches and a slot length of 0.405 inches and produces a circuit having an interaction impedance ranging from 50 to 110Ω over the operating range of 90° to 170° phase shift per section as shown by line 19 of FIG. 14. This resulted in an operating tube having an overall efficiency of 30 percent. On the other hand, a comparable prior art circuit 3 would have a path length $\iota_1$ of 0.448 inches with finger and slot lengths of 0.360 inches, and an interaction impedance as shown by line 21 of FIG. 14 which ranged from a high of 57Ω to a low of 27Ω. Such a circuit resulted in an operating tube having an overall efficiency of only 4½ percent when operated at comparable power levels, frequencies, and field strength B.

Referring now to FIGS. 10–12 there is shown an alternative slow wave circuit embodiment of the present invention wherein the reactively loaded interdigital line is stub supported. More particularly, an array of conductive stub members 22 interconnect the back side edges of the conductive fingers 12 and 13, near the free ends thereof, and the back support wall structure 5. The stubs preferably have a higher impedance than the interdigital slow wave circuit 3 which means that the stubs 22 preferably have a width $W_2$ which is less than the width $W_f$ of the fingers 12 and 13. Also the stubs 22 preferably have a length $\iota_s$ greater than the finger length $\iota_f$. The stubs 22 provide still further mechanical strength for the circuit 3 and enhance thermal conductivity from the fingers 12 and 13 to the back support wall structure 5. The slow wave circuit 3 may also be crown supported as well as stub supported, in which case the support wall structure 5 forms a conductive connection to the elongated conductor portions 9 and 11 as shown by the dotted lines 20 of FIG. 11 near the root portions of the fingers or vanes 12 and 13. The combined crown and stub support structure further increases the thermal capacity of the slow wave circuit 3 with some sacrifice of interaction impedance.

Referring now to FIG. 13 there is shown an alternative circuit embodiment of the present invention which is especially adapted for linear-type O-beam tubes. More specifically, the interdigital fingers 12 and 13 are centrally apertured to form ring portions 12′ and 13′ which are coaxially aligned in a direction parallel to the direction of the elongated conductors 9 and 11. A beam of electrons 23 is projected through the aligned rings 12′ and 13′ for cummulative interaction with the fields of the slow wave circuit 3. The conductive support wall structure 5′ is tubular and coaxially aligned with the rings 12′ and 13′. The circuit 3 may be crown supported by the elongated conductors 9 and 11 being conductively connected to the tubular support wall 5′ as shown in FIG. 13. Alternatively the circuit 3 may be supported by dielectric insulator members such as sapphire rods 24 or fins interconnecting the rings 12′ or 13′ or conductors 9 and 11 and the support wall 5′ as shown in FIG. 13*a*. If the ring circuit 3 is supported by the dielectric insulative members 24 the circuit will have a lower low-frequency cutoff $\omega_1$ with some sacrifice in the thermal capacity of the circuit 3.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A reactively loaded interdigital line slow wave circuit including, means forming a first elongated conductor having a plurality of periodic conductive elements projecting therefrom, means forming a second elongated conductor having a plurality of periodic conductive elements projecting therefrom, said periodic conductive elements of said first and second conductor means being interdigitated to form an array of interdigitated periodic elements to define a slow wave circuit, said periodic conductive elements being bifurcated to provide reactive loading slot means in said slow wave circuit, and said reactive loading slot means having a length which is at least 20 percent greater than the length of the adjoining projecting conductive elements whereby the interaction impedance of said slow wave circuit is increased as compared to a similar slow wave circuit wherein the loading slots have lengths equal to the length of the adjoining periodic elements.

2. The apparatus of claim 1 wherein the length of the reactive loading slot means are at least twice the length of the adjoining periodic elements.

3. The apparatus of claim 1 wherein said periodic conductive elements are bifurcated fingers having a length greater than their width.

4. The apparatus of claim 1 including means forming a conductive support wall disposed adjacent said slow wave circuit, an array of conductive stub members connected to said bifurcated periodic elements and projecting away therefrom in a direction perpendicular to the elongated direction of said first and second conductors and interconnecting said periodic elements with said support wall means, and wherein said support stub members have a width which is less than the width of said bifurcated periodic elements.

5. The apparatus of claim 3 including a conductive support wall structure disposed adjacent said slow wave circuit, said support wall being connected to said bifurcated fingers at the root ends thereof and being spaced away from said fingers intermediate their length to form a crown-supported slow wave circuit.

6. The apparatus of claim 1 including in combination, means for producing a stream of electrons adjacent said slow wave circuit for cummulative electronic interaction with wave energy on said slow wave circuit, and means for extracting wave energy from said slow wave circuit.

7. The apparatus of claim 6 wherein said slow wave circuit is arcuate in the elongated direction of said first and second conductors, wherein said means for producing a stream of electrons adjacent said slow wave circuit includes an arcuate cathode electrode coaxially disposed of said arcuate slow wave circuit in spaced relation to define an electronic interaction region therebetween, and means for producing an axially directed magnetic field in said electronic interaction region.

8. The apparatus of claim 1 wherein said bifurcated elements include ring portions with the axes of said rings being aligned in parallel relation with the elongated direction of said first and second conductors, and including means for projecting a stream of electrons axially through said ring portions for cummulative electronic interaction with wave energy traveling in said slow wave circuit.

9. The apparatus of claim 8 including a tubular conductive support wall coaxially disposed of and surrounding said slow wave circuit with said first and second elongated conductor means radially extending to and interconnecting said support wall and said array of axially aligned ring portions.

10. The apparatus of claim 8 including a tubular conductive support wall coaxially disposed of and surrounding said slow wave circuit, and including dielectric insulative support means interconnecting and supporting said slow wave circuit from said surrounding tubular wall.

* * * * *